United States Patent
Bae et al.

(10) Patent No.: US 11,934,990 B2
(45) Date of Patent: Mar. 19, 2024

(54) APPARATUS AND METHOD FOR OUTPUTTING A CONTINUOUSLY CHANGED QR CODE BY REFLECTING A MONITORED LOGISTICS STATUS

(71) Applicant: Willog Co., Ltd., Seoul (KR)

(72) Inventors: Sung Hoon Bae, Seoul (KR); Ji Hyun Yun, Pyeongtaek-si (KR)

(73) Assignee: Willog Co., Ltd., Seoul (KR)

( * ) Notice: Subject to any disclaimer, the term of this patent is extended or adjusted under 35 U.S.C. 154(b) by 203 days.

(21) Appl. No.: 17/570,464

(22) Filed: Jan. 7, 2022

(65) Prior Publication Data
US 2022/0129845 A1 Apr. 28, 2022

Related U.S. Application Data

(63) Continuation of application No. PCT/KR2021/005137, filed on Apr. 23, 2021.

(30) Foreign Application Priority Data

Apr. 23, 2020 (KR) .......... 10-2020-0049175
Nov. 19, 2020 (KR) .......... 10-2020-0156004

(51) Int. Cl.
*G06Q 10/0833* (2023.01)
*G06K 7/14* (2006.01)
*G06Q 10/0832* (2023.01)

(52) U.S. Cl.
CPC ......... *G06Q 10/0833* (2013.01); *G06K 7/143* (2013.01); *G06Q 10/0832* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

2006/0291657 A1* 12/2006 Benson .................. G06Q 50/26
709/224
2010/0042517 A1* 2/2010 Paintin ................... G06Q 30/02
705/30

(Continued)

FOREIGN PATENT DOCUMENTS

JP 2006-232417 A 9/2006
JP 2016-222417 A 12/2016

(Continued)

OTHER PUBLICATIONS

InfoPodQR, "Up-to-Date Content with Dynaymic QR Codes", screen capture of Dec. 4, 2019 via webarchive, available at: https://web.archive.org/web/20191204161916/http://www.qrinfopod.co.uk/dynamic-qr-codes/; last accessed Jan. 9, 2024. (Year: 2019).*

(Continued)

*Primary Examiner* — Emmett K. Walsh
(74) *Attorney, Agent, or Firm* — Studebaker & Brackett PC

(57) ABSTRACT

Disclosed is a an apparatus for performing smart logistics monitoring including a display unit, a memory, a sensor unit sensing at least one of a temperature, acceleration, humidity, illuminance, inclination, impact, and location of an inside of a logistics vehicle, and a control unit that generates respective status information of a logistics according to a sensed result at a predetermined period, generates a respective QR code indicating the respective status information, and displays the respective QR code on a screen of the display unit. The respective QR code is converted and displayed on the screen depending on an order in which the respective QR code is generated.

14 Claims, 9 Drawing Sheets

(56) References Cited

U.S. PATENT DOCUMENTS

| | | | | |
|---|---|---|---|---|
| 2015/0054621 A1* | 2/2015 | Lin | ................... | G06K 19/0716 |
| | | | | 235/494 |
| 2017/0372260 A1* | 12/2017 | Desmarais | ............... | G01K 3/04 |
| 2019/0156166 A1* | 5/2019 | Karthikeyan | ........ | G06Q 10/083 |

FOREIGN PATENT DOCUMENTS

| | | | |
|---|---|---|---|
| JP | 2018-076160 A | 5/2018 |
| KR | 10-2015-0121367 A | 10/2015 |
| KR | 10-2019-0056451 A | 5/2019 |
| KR | 10-2015456 B1 | 8/2019 |
| KR | 10-2020-0004525 A | 1/2020 |
| KR | 10-2077279 B1 | 2/2020 |

OTHER PUBLICATIONS

International Search Report issued in PCT/KR2021/005137; dated Jul. 28, 2021.

\* cited by examiner

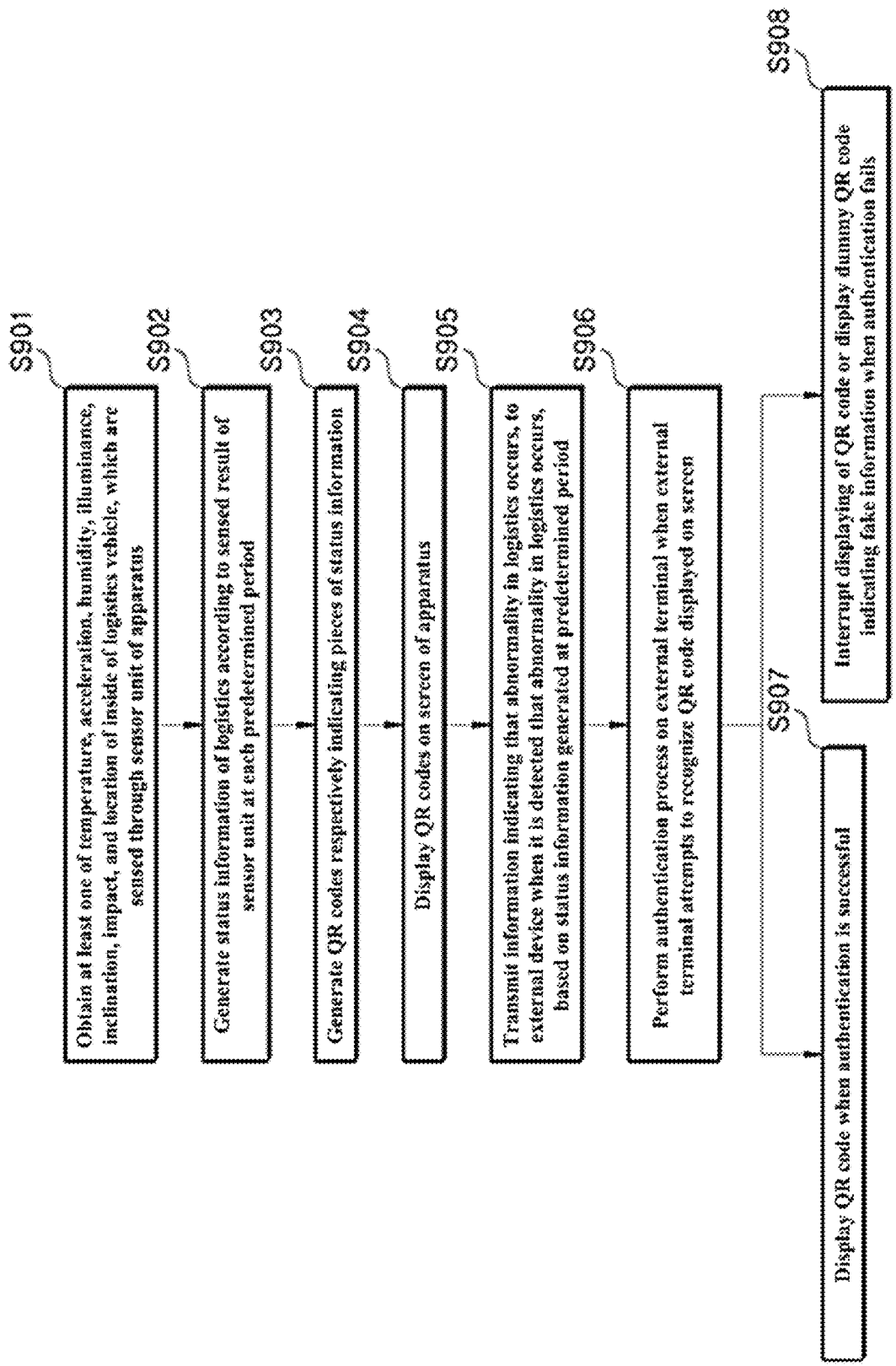

APPARATUS AND METHOD FOR OUTPUTTING A CONTINUOUSLY CHANGED QR CODE BY REFLECTING A MONITORED LOGISTICS STATUS

CROSS-REFERENCE TO RELATED APPLICATIONS

The present application is a continuation of International Patent Application No. PCT/KR2021/005137, filed on Apr. 23, 2021, which is based upon and claims the benefit of priority to Korean Patent Application Nos. 10-2020-0049175 filed on Apr. 23, 2020 and 10-2020-0156004 filed on Nov. 19, 2020. The disclosures of the above-listed applications are hereby incorporated by reference herein in their entirety.

BACKGROUND

Embodiments of the inventive concept described herein relate to an apparatus for performing smart logistics monitoring through a QR code generated based on status information in a logistics vehicle delivering logistics, and a control method thereof.

Generally, in a process of distributing logistics, due to the nature of logistics, there are cases in which the logistics are damaged or unusable due to temperature, humidity, or impact. The logistics are managed and monitored through a monitoring system such as (Patent Document 1) to (Patent Document 3) below. There is a prior art disclosed as Korean Registered Patent No. 10-2015456 (Patent Document 1).

Embodiments of the inventive concept described herein relate to a logistics warehouse management system that may solve the selection limitation of client software by using OLE for Process Control (OPC), may transmit an SMS message or MMS message by using OPC together with visual image information when an abnormal condition occurs to a manager's personal terminal such that a logistics warehouse manager is capable of making a timely and appropriate response, may prevent fire from spreading to adjacent buildings when the fire occurs in a logistics warehouse and at the same time may allow fire evacuees to evacuate themselves from a rooftop to the ground, and a control method thereof. The logistics warehouse management system includes an OPC control unit that obtains information about an abnormal status of logistics warehouse from sensors and cameras installed inside and outside the logistics warehouse and sends the SMS messages or the MMS messages to the manager's personal terminal by using OPC, a receiver connected to the OPC control unit, a modem connected to the receiver, a main server connected to the modem, and firefighting equipment connected to the main server. The OPC control unit includes a sensor unit for detecting the abnormal condition inside and outside the logistics warehouse, a PLC unit connected to the sensor unit, an OPC communication driver connected to the PLC unit and performing a communication protocol, a HMI system connected to the OPC communication driver, an SMS and MMS server connected to the HMI system and generating SMS and MMS by using OPC, an SMS and MMS sending and receiving terminal connected to the SMS and MMS server, and a personal terminal connected to the SMS and MMS sending and receiving terminal through a wireless Internet network. The OPC control unit detects whether there is an abnormal status in the logistics warehouse, by using a signal input from a sensor unit. The OPC control unit transmits abnormal status information to a HMI system when an abnormal state of the logistics warehouse is detected. The OPC control unit converts the signal photographed by a photographing means into a digital image, and then determines whether an image change rate of the image converted to the digital image is 20% or more. When the image change rate is greater than 20%, the OPC control unit sends abnormal image information to the HMI system. When the abnormal status information or abnormal image information is received, the OPC control unit generates SMS and MMS by using OPC by operating the SMS and MMS server. The OPC control unit transmits image information along with status information to the personal terminal by operating the SMS and MMS sending terminal by a SMS and MMS server program. The OPC control unit verifies whether the status information and image information transmitted to the personal terminal are abnormal in the personal terminal. When it is verified that it are abnormal in the personal terminal, the OPC control unit replies to the HMI system through the SMS and MMS sending and receiving terminal. The OPC control unit operates firefighting equipment in a main server by sending verification confirmation information from the HMI system to the main server.

There is a prior art disclosed as Korean Patent Publication No. 10-2020-0004525 (Patent Document 2).

It relates to a logistics management system having improved transportation efficiency. According to an embodiment of the inventive concept, a logistics management system includes a transport vehicle loading goods and a center server that collects operation information of the transport vehicle and information about goods loaded onto the transport vehicle and resets the allocation of transport vehicles and the arrangement of goods at the transit point by using the collected information, and a transfer server located at the transit point and receiving information about the allocation of the transport vehicle and the arrangement of goods at the transit point, which are set in the central server.

There is a prior art disclosed as Korean Registered Patent No. 10-2077279 (Patent Document 3).

A logistics management system operating method may include bringing in an object, locating an imported object to a mounting structure, and taking out the object from the holding structure. The mounting structure including a plurality of first frames provided in a vertical direction, and a plurality of second frames provided in a vertical direction on the first frame. Accordingly, a logistics management system provides an appropriate means for carrying in and out of the object.

However, nowadays, logistics shipments are rapidly increasing. For these prior arts, to check a status of the logistics loaded on a vehicle, a person who transports directly checks status information such as a temperature, humidity, and impact in the vehicle and writes a paper certificate by hand. In this case, a lot of time may be wasted, thereby reducing transportation efficiency.

Accordingly, it is necessary for a transport efficiency improving method in which a person transporting logistics directly grasps logistics status information in a logistics vehicle and directly send the logistics status information to a manager or a customer without writing a paper certificate by hand.

SUMMARY

Embodiments of the inventive concept provide a status dataset in a logistics vehicle in a form of QR code by sensing at least one of the temperature, acceleration, humidity, illuminance, inclination, impact, and location of the inside of the logistics vehicle that delivers logistics.

Embodiments of the inventive concept generate a QR code at each time, at which a user requests the QR code, or at each period designated by a user when the QR code is created and provide the QR code to the user.

Besides, the inventive concept is configured such that recycling is possible when a logistics vehicle is scrapped or re-purposed.

Problems to be solved by the inventive concept are not limited to the problems mentioned above, and other problems not mentioned will be clearly understood by those skilled in the art from the following description.

According to an embodiment, an apparatus for performing smart logistics monitoring includes a display unit, a memory, a sensor unit sensing at least one of a temperature, acceleration, humidity, illuminance, inclination, impact, and location of an inside of a logistics vehicle, and a control unit that generates respective status information of a logistics according to a sensed result at a predetermined period, generates a respective QR code indicating the respective status information, and displays the respective QR code on a screen of the display unit. The respective QR code is converted and displayed on the screen depending on an order in which the respective QR code is generated.

Furthermore, the apparatus further includes an input unit including a plurality of buttons. The control unit displays a QR code, which corresponds to a point in time when a first button of the input unit is operated, from among the respective QR code on the screen.

Moreover, the respective QR code is sequentially changed and displayed whenever the first button is operated.

Also, the apparatus further includes an input unit including a plurality of buttons. The control unit sets a specific time zone depending on an input of a second button of the input unit, searches for at least one QR code, which is generated during the set specific time zone, from among the respective QR code, and displays the at least one QR code on the screen.

Besides, the apparatus further includes a communication unit that communicates with an external device. When it is detected that an abnormality in the logistics occurs, based on the respective status information generated at the predetermined period, the control unit transmits information for indicating that the abnormality in the logistics has occurred, to the external device.

In addition, the control unit transmits a QR code at a point in time when the abnormality of the logistics occurs, so as to be displayed on an audio-video-navigation (AVN) screen of the logistics vehicle.

Furthermore, when an external terminal attempts to recognize a QR code displayed on the screen, the control unit performs an authentication process on the external terminal.

Moreover, the apparatus further includes a communication unit that communicates with the external device. The control unit transmits a request signal of authentication information to the external terminal through the communication unit, and determines whether authentication is successful, based on the authentication information received from the external terminal.

Also, when the authentication is successful, the control unit displays the QR code. When the authentication fails, the control unit interrupts displaying of the QR code or displays a dummy QR code indicating fake information.

Besides, when the logistics vehicle is scrapped or re-purpose, the apparatus is collected from the logistics vehicle and recycled.

In addition, another method and another system for implementing the inventive concept, and a computer-readable recording medium for recording a computer program for performing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 9 is a flowchart illustrating a process of controlling smart logistics monitoring in an apparatus, according to an embodiment of the inventive concept.

DETAILED DESCRIPTION

Figure 1:
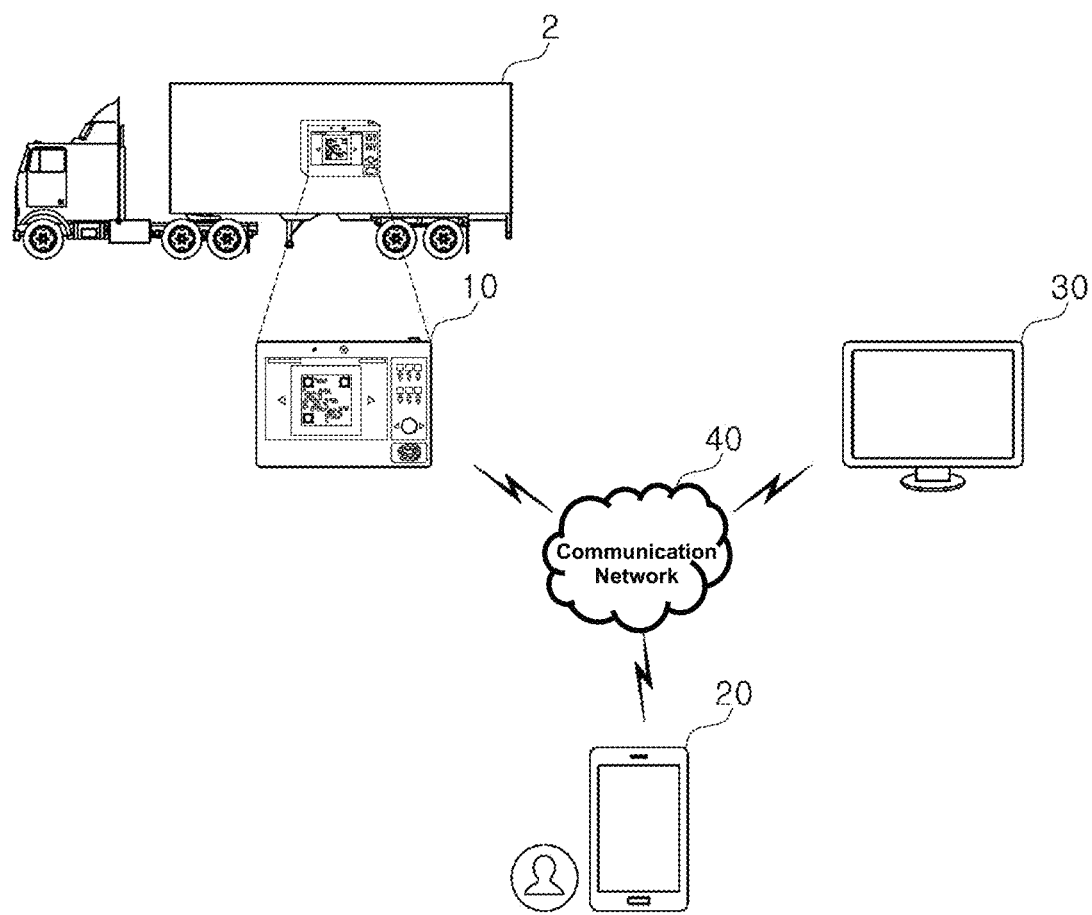
FIG. 1 is a diagram schematically illustrating a system for performing smart logistics monitoring, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

Unless otherwise defined, all terms (including technical and scientific terms) used herein have the same meaning as commonly understood by those skilled in the art to which the inventive concept pertains. The terms, such as those defined in commonly used dictionaries, should not be interpreted in an idealized or overly formal sense unless expressly so defined herein.

Hereinafter, an embodiment of the inventive concept will be described in detail with reference to the accompanying drawings.

FIG. 1 is a diagram schematically illustrating a system 1 for performing smart logistics monitoring, according to an embodiment of the inventive concept.

Figure 2:
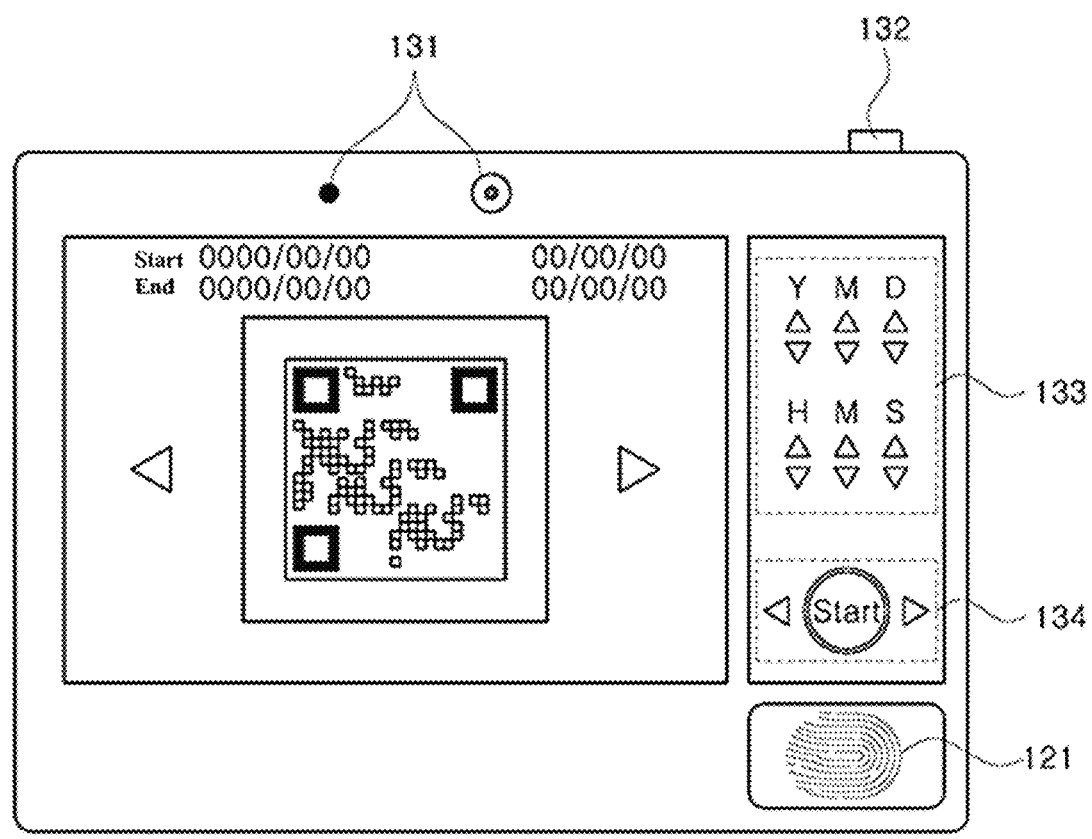
FIG. 2 is a block diagram schematically illustrating a device for performing smart logistics monitoring, according to an embodiment of the inventive concept.

FIG. 2 is a block diagram schematically illustrating an apparatus 10 for performing smart logistics monitoring, according to an embodiment of the inventive concept.

Figure 3:
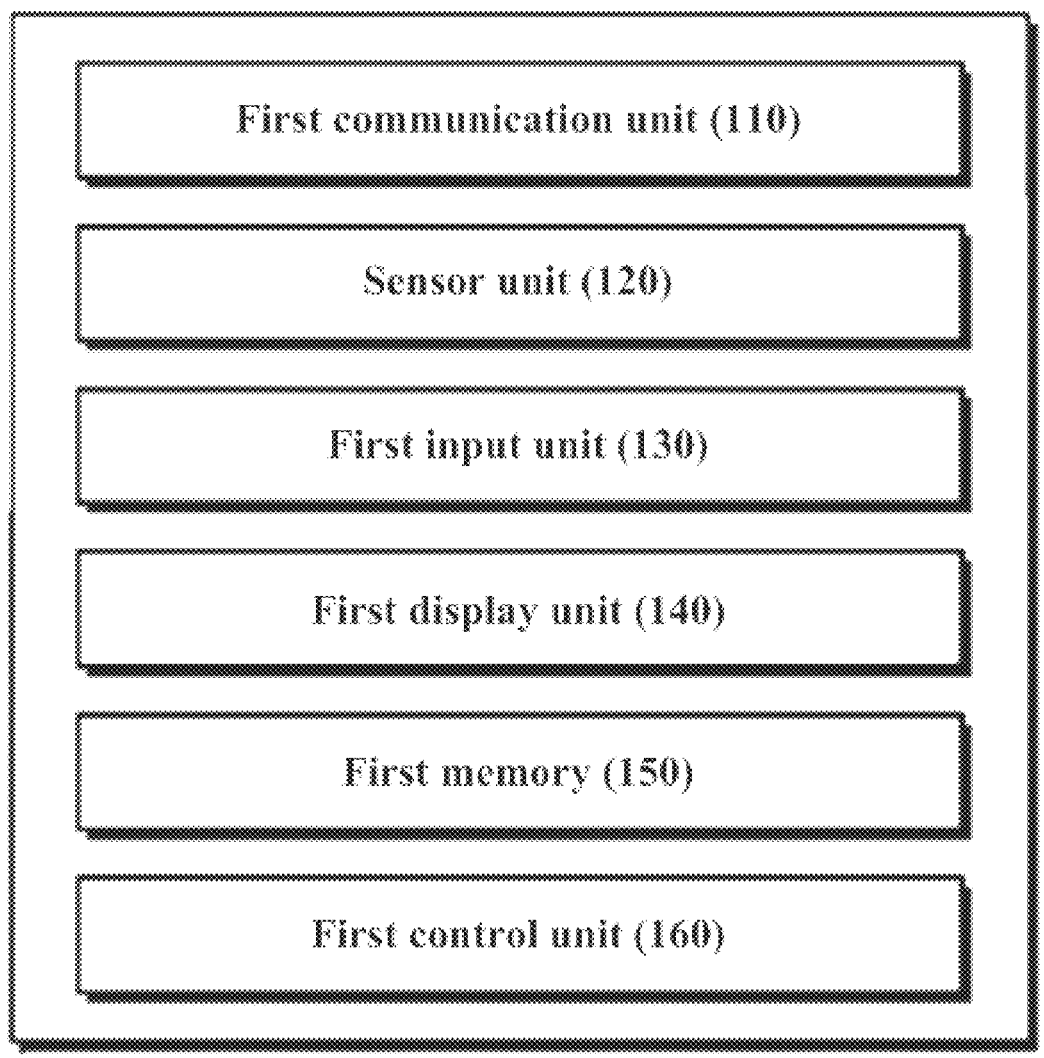
FIG. 3 is a diagram illustrating a device for performing smart logistics monitoring, according to an embodiment of the inventive concept.

FIG. 3 is a diagram illustrating the apparatus 10 for performing smart logistics monitoring, according to an embodiment of the inventive concept.

Figure 4:
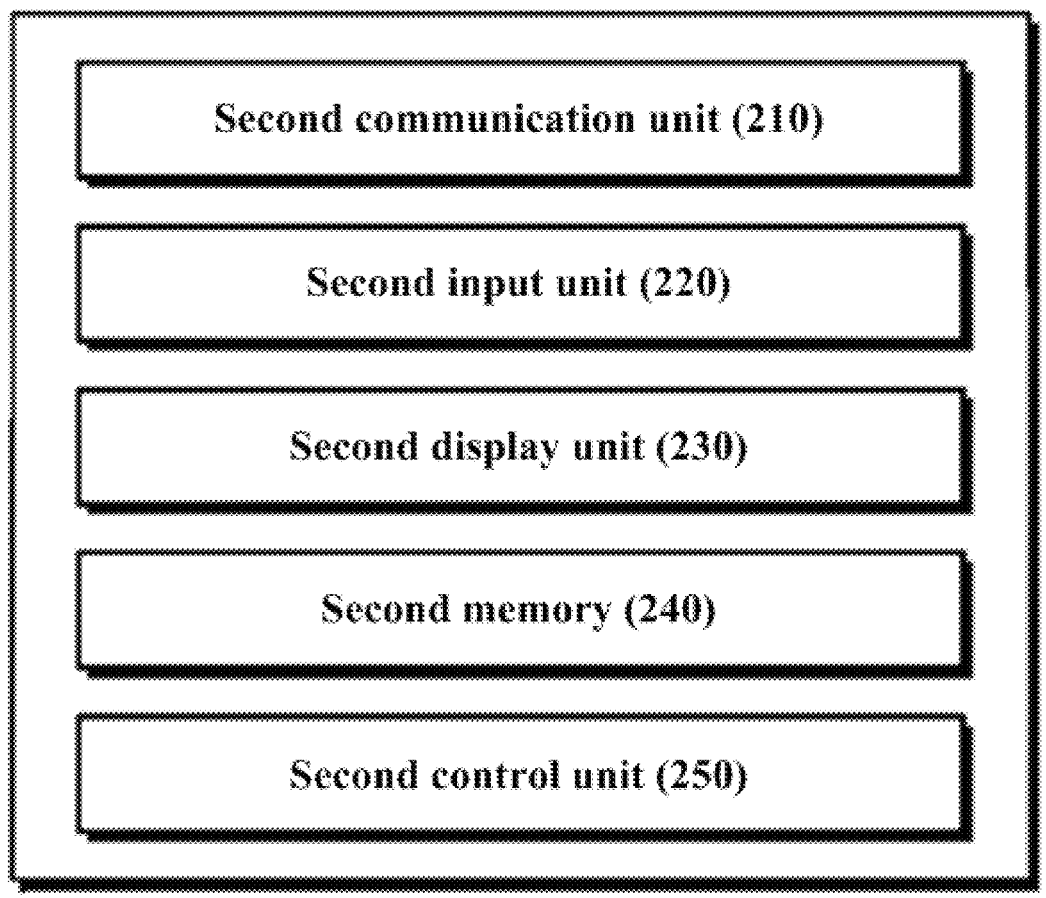
FIG. 4 is a block diagram schematically illustrating an external terminal, according to an embodiment of the inventive concept.

FIG. 4 is a block diagram schematically illustrating an external terminal 20, according to an embodiment of the inventive concept.

Hereinafter, the system 1 for performing smart logistics monitoring according to an embodiment of the inventive concept will be described with reference to FIGS. 1 and 4. Here, the system 1 may include fewer or more components than the components illustrated in FIGS. 1 to 4.

The system 1 performing smart logistics monitoring may include the apparatus 10, which is attached to and detached from a logistics vehicle transporting logistics and generates status information in the logistics vehicle, an external terminal 20 recognizing a QR code provided by the apparatus 10, an external device 30 receiving the QR code, and a communication network 40.

The system 1 may sense at least one of the temperature, acceleration, humidity, illuminance, inclination, impact, location, and proximity of the inside of a logistics vehicle 2 that delivers logistics, and may provide status information in the logistics vehicle to the apparatus 10 in a form of a QR code. In a case where a user has the external terminal 20 capable of recognizing the QR code and the corresponding app, when the system 1 omits a cumbersome process and easily recognizes the QR code through the external terminal 20, the system 1 may easily, accurately and conveniently check a status inside the logistics vehicle and may take necessary actions.

Here, the status information means may consist of at least one of a temperature, humidity, or illuminance for storing logistics in an appropriate environment, a slope that needs to be loaded such that the contents of the logistics do not spill, an impact on fragile logistics, such as glass, and a transportation location of the logistics. the status information required when the corresponding logistics is stored or transferred is set in advance and used. For example, assuming that an item is bottled milk, the logistics status information includes, for example, a change in temperature or humidity for storing milk without spoiling, or the strength of impact for preventing bottle breakage. It is preferable that the status information of a logistics basically includes location information indicating the location of the logistics. This is to accurately and quickly provide a notification of a transportation location of the logistics directly managed or purchased by a seller and a buyer due to the nature of logistics.

Moreover, because the system 1 simplifies a procedure of identifying a status in the logistics vehicle 2, an integrated monitoring service is possible, thereby increasing efficiency. In addition, it is possible to minimize the issuance of many paper certificates, such as certificate documents and inspection papers, which need to be submitted at each time in a conventional distribution process.

Moreover, the system 1 may reduce a risk of being hacked and may prevent manipulation of logistics status, by generating a QR code at each time at which a user requests the QR code or at each period designated by a user when the QR code is created and providing the QR code to the user. Accordingly, reliability of data may be increased.

Besides, the user may set a period of the QR code to the desired period, and then the system 1 may be configured to recognize the period of the QR code. Accordingly, the system 1 may obtain easily status information having a period during which a distribution worker or seller wants to identify a product.

Also, when the logistics vehicle 2 is scrapped or re-purposed, the system 1 may reduce the waste of the apparatus 10 by configuring the apparatus 10 so as to be recyclable. Accordingly, cost may be reduced.

The apparatus 10 may be attached and detached within the logistics vehicle 2 that delivers logistics. In this way, the apparatus 10 may be configured to provide status information in the logistics vehicle 2 in a form of a QR code by sensing at least one of the temperature, acceleration, humidity, illumination, inclination, impact, location, and proximity Here, the logistics is a product for transport, and refers to a product that needs to be protected from deterioration, temperature changes, and external impacts during a transportation process. The apparatus 10 may record status information in a QR code. When the apparatus 10 reads out the QR code through the external terminal 20 capable of recognizing the QR code, the apparatus 10 may identify the status information.

Here, the apparatus 10 is detachable. Accordingly, when the logistics vehicle 2 is scrapped or re-purposed, the apparatus 10 may be collected from the logistics vehicle 2 and then may be recycled.

Referring to FIG. 1, the apparatus 10 is shown as one apparatus installed in the single logistics vehicle 2, but is not necessarily limited thereto. For example, the plurality of apparatuses 10 may be installed in the logistics vehicle 2, and may be installed in a detachable form anywhere inside the logistics vehicle 2.

The apparatus 10 may include a first communication unit 110, a sensor unit 120, a first input unit 130, a first display unit 140, a first memory 150, and a first control unit 160. Herein, the apparatus 10 may include fewer or more components than the components illustrated in FIGS. 2 and 3.

The first communication unit 110 may include one or more modules that enable wireless communication between the apparatus 10 and a wireless communication system, between the apparatus 10 and the external terminal 20, or between the apparatus 10 and the external device 30. Furthermore, the first communication unit 110 may include one or more modules connecting the apparatus 10 to one or more networks.

Moreover, the first communication unit 110 may be a module for obtaining a location (or a current location) of the apparatus 10 and may typically include a global positioning system (GPS) module or a Wireless Fidelity (Wi-Fi) module.

For example, when the apparatus 10 utilizes the GPS module, the apparatus 10 may obtain the location by using a signal received from a GPS satellite. As another example, when the apparatus 10 utilizes the Wi-Fi module, the apparatus 10 may obtain the location based on information of a wireless access point (AP) that transmits or receives wireless signals to or from the Wi-Fi module. The first communication unit 110 is not limited to directly calculating or obtaining the location of the apparatus 10.

The sensor unit 120 may sense at least one of the temperature, acceleration, humidity, illuminance, inclination, impact, location, and proximity of the inside of the logistics vehicle. The sensor unit 120 may sense surrounding environment information surrounding the apparatus 10 and may generate a sensed signal corresponding to the surrounding environment information. On the basis of the sensed signal, the first control unit 160 may control the driving or operation of the apparatus 10 or may perform the data processing, function, or operation associated with an application program installed in the apparatus 10.

For example, the sensor unit 120 may include at least one of a proximity sensor, an illumination sensor, an acceleration sensor, a G-sensor, a gyroscope sensor, a motion sensor, an infrared (IR) sensor, a finger scan sensor 121, an optical sensor, an ultrasonic sensor, an infrared ray sensor, an environmental sensor (e.g., a barometer, a hygrometer, a thermometer, a radiation detection sensor, a heat detection sensor, a gas detection sensor, or the like), or a chemical sensor (e.g., a healthcare sensors, a biometric sensors, or the like). In addition, the sensor unit 120 may further include a location sensor for detecting a location. In the meantime, the apparatus 10 disclosed in this specification may combine and utilize pieces of information sensed by at least two or more of these sensors.

Here, the proximity sensor refers to a sensor that detects whether there is an object approaching a predetermined detection surface or an object existing in the vicinity, without mechanical contact by using the power of an electromagnetic field or infrared light. Such the proximity sensor may be positioned in the vicinity of the touch screen or the inner region of the external terminal surrounded by the touch screen described above.

The first input unit 130 may be used to enter image information (or signal), audio information (or signal), data, or information entered by a user. To enter image information, the apparatus 10 may include at least one first camera 131. The first camera 131 may process an image frame such as a still image or a moving image, which is obtained by an image sensor in a shooting mode. The processed image frame may be displayed on the first display unit 140 or may be stored in the first memory 150. Also, the first camera 131 may include at least one of a camera for recognizing an iris and a camera for capturing an image.

The first input unit 130 may include at least one button among a start or screen on/off button 132, a time setting button 133, and an adjustment button 134 for displaying a QR code. Here, the button may be implemented with a physical hardware button or a virtual button displayed on a touch screen. For the virtual button, the virtual button may be generated on the first display unit 140 in a form of the touch screen. When a user pushes the on/off button 132 during a preset time or more, the apparatus 10 may be shut down. When the user pushes the on-off button 132 at short intervals, a screen of the apparatus 10 may be turned on or off.

The first display unit 140 may have a mutual layer structure with the touch sensor or may be integrally formed with the touch sensor, and thus a touch screen may be implemented. Such the touch screen may provide an input interface between the apparatus 10 and a user and may, at the same time, provide an output interface between the apparatus 10 and the user. The first display unit 140 may display a QR provided by the apparatus 10.

The first memory 150 may store data for supporting various functions of the apparatus 10, especially a QR code. The first memory 150 may store a plurality of application programs (or applications) running in the apparatus 10, data for an operation of the apparatus 10, and instructions. At least part of the application programs may be downloaded from an external server (not illustrated) through wireless communication. Besides, at least part of the application programs may be present for basic functions of the apparatus 10. In the meantime, the application program may be stored in the first memory 150, may be installed in the apparatus 10, and may be driven by the first control unit 160 so as to perform an operation (or function) of the apparatus 10.

In addition to an operation associated with the application program, the first control unit 160 may generally control overall operations of the apparatus 10. The first control unit 160 may provide or process appropriate information or functions to a user, by processing a signal, data, information, or the like, which is input or output through the above-described components, or driving the application program stored in the first memory 150.

Besides, the first control unit 160 may control at least part of the components described with reference to FIG. 2 to operate the application program stored in the first memory 150. Furthermore, the first control unit 160 may combine and operate at least two or more of the components included in the apparatus 10 to operate the application program.

The first control unit 160 may generate status information of logistics according to the sensed result of the sensor unit 120 at every predetermined cycle and then may generate the QR code by paging the status information at a predetermined period or in real time. Here, the QR code may be switched and displayed on the screen depending on the generated order. The QR image may change continuously until the number of units of the status information is filled.

The QR code has a two-dimensional configuration capable of recording up to 7,089 numbers, 4,296 characters, and 1,817 Chinese characters by using horizontal and vertical sizes. The QR code may include an Internet address (URL) of a long sentence, photo and video information, map information, business card information, and the like. In a QR code, as the number of square points increases, more information may be recorded. However, as the number of points increases, the required area increases. Also, the QR code is superior to a general barcode in recognition speed, recognition rate, and resilience. As suggested by the name of "quick response", a 'quick response' is possible. Recently, the QR code has been widely used online/offline as the QR code is commonly used as an important promotion/marketing means for companies. Also, because the QR code has a square in shape, the QR code may be accurately recognized even when the QRS code is read 360 degrees in any direction. Because the QR code is hardly affected by a background picture, the QR code may be inserted into various types of promotional materials. The existing one-dimensional barcode may store only numeric information of about 20 numbers. On the other hand, the QR code may store up to 7,089 numeric characters, up to 4,296 characters (ASCII), up to 2,953 bytes for binary (8-bit), and up to 1,817 Chinese characters. The QR code is superior to a general barcode in recognition speed, recognition rate, and resilience. The barcode is mainly used for calculation, inventory management, and product check. On the other hand, the QR code is widely used as a means of marketing, promotion, and PR means.

Besides, because a dedicated external terminal capable of reading out an existing barcode is owned by only a product seller, it has been impossible for consumers to identify information through the barcode. However, for the QR code, the consumers may directly obtain product information with only a smartphone. Users of smartphones download a free QR code scanning application. When the users scan a QR code posted on billboards, promotional papers, posters, magazines, and Internet by using their smartphones, the users may easily obtain various types of information.

The first control unit 160 may generate QR codes respectively indicating pieces of status information, may store the QR codes in the first memory 150, and may display the QR codes on a screen of the first display unit 140. Here, each of the QR codes may be converted and displayed on the screen depending on the order in which the QR codes are generated.

The first control unit 160 may display a QR code, which corresponds to a point in time when the first button of the first input unit 130 (e.g., the adjustment button 134) is entered onto the screen, from among the QR codes. Here, each of the QR codes may be sequentially changed and displayed whenever the first button 134 is entered.

The external terminal 20 may be an electronic device capable of recognizing a QR code possessed by a delivery person who delivers logistics, a person in charge of managing logistics, or the like. Here, the external terminal 20 may include all kinds of handheld-based wireless communication devices, which are capable of being connected to a web server through a network, such as a mobile phone, a smartphone, a personal digital assistant (PDA), a portable multimedia player (PMP), a tablet PC, or the like.

The external terminal 20 may include a second communication unit 210, a second input unit 220, a second display unit 230, a second memory 240, and a second control unit 250. Herein, the external terminal 20 may include fewer or more components than the components illustrated in FIG. 2.

The second communication unit 210 may include one or more modules that enable wireless communication between the external terminal 20 and a wireless communication system, between the external terminal 20 and the external device 30, or between the external terminal 20 and a server (not illustrated). Furthermore, the second communication unit 210 may include one or more modules connecting the external terminal 20 to one or more networks.

The second input unit 220 may be used to enter image information (or signal), audio information (or signal), data, or information entered by a user. To enter image information, the external terminal 20 may include at least one second camera on a front surface or a rear surface thereof. The second camera may process an image frame such as a still image or a moving image, which is obtained by an image sensor in a video call mode or a shooting mode. The processed image frame may be displayed on the second display unit 230 or may be stored in the second memory 240. In the meantime, the at least one second camera provided in the external terminal 20 may be positioned to have a matrix structure. Pieces of image information having various angles or focal points may be entered into the external terminal 20 through the second camera having the matrix structure in this manner. Furthermore, the second camera may be positioned in a stereo structure to obtain a left image and a right image for implementing a stereoscopic image.

The second camera may capture an image or video depending on a user's operation. Here, the second camera may be a recognizer capable of capturing a QR code provided by the apparatus 10 depending on the user's operation.

The second input unit 220 may be used to receive information from the user. When the information is entered through the second input unit 220, the second control unit 250 may control the operation of the external terminal 20 to correspond to the entered information. The second input unit 220 may include a mechanical input means (or a mechanical key, for example, a button positioned on the front, rear, or side of the external terminal 100, a dome switch, a jog wheel, a jog switch, or the like) and a touch input means. For example, the touch input means may consist of a virtual key, a soft key, or a visual key displayed on a touch screen through software processing or may consist of a touch key positioned on a portion other than the touch screen. In the meantime, the virtual key or the visual key may be displayed on the touch screen while having various shapes. For example, the virtual key or visual key may be formed of graphics, texts, icons, video, or a combination thereof.

The second display unit 230 may have a mutual layer structure with the touch sensor or may be integrated with the touch sensor. Accordingly, the second display unit 230 may implement the touch screen. Such the touch screen may provide an input interface between the external terminal 20 and a user and may, at the same time, provide an output interface between the external terminal 20 and the user.

When the second camera of the second input unit 220 recognizes a QR code provided by the apparatus 10, the second display unit 230 may display the recognized QR code and status information included in the recognized QR code.

The second memory 240 may store data for supporting various functions of the external terminal 20. The second memory 240 may store a plurality of application programs (or applications) running in the external terminal 20, data for an operation of the external terminal 20, and instructions. At least part of the application programs may be downloaded from an external server through wireless communication. Moreover, at least part of these applications may be present for basic functions (e.g., an incoming and outgoing call function or an incoming and outgoing message function) of the external terminal 20. In the meantime, the application program may be stored in the second memory 240, may be installed in the external terminal 20, and may be driven by the second control unit 250 so as to perform an operation (or function) of the external terminal 20.

In addition to an operation associated with the application program, the second control unit 250 may generally control overall operations of the external terminal 20. The second control unit 250 may provide or process appropriate information or functions to a user, by processing a signal, data, information, or the like, which is input or output through the above-described components, or driving the application program stored in the second memory 240.

Besides, the second control unit 250 may control at least part of the components described with reference to FIG. 3 to operate the application program stored in the second memory 240. Furthermore, the second control unit 250 may combine and operate at least two or more of the components included in the external terminal 20 to operate the application program.

The external device 30 may refer to a device, which needs to receive status information in the logistics vehicle, such as a server that collectively manages logistics, a server of a producer that delivers the logistics, and a server of a customer that receives the logistics.

Here, the external device 30 may include all kinds of handheld-based wireless communication devices, which are capable of being connected to a web server through a network, such as a mobile phone, a smartphone, a personal digital assistant (PDA), a portable multimedia player (PMP), a tablet PC, or the like. In addition, the external device 30 may be one of digital devices, which are equipped with a memory means and which have computing power by mounting a microprocessor, such as a personal computer (e.g., a desktop computer, a notebook computer, or the like), a workstation, a PDA, a web pad, or the like.

The communication network 40 may transmit or receive various pieces of information between the apparatus 10, the external terminal 20, and the external device 30. Various types of communication networks may be used. For example, wireless communication methods such as wireless LAN (WLAN), Wi-Fi, Wibro, Wimax, High Speed Downlink Packet Access (HSDPA), and the like or wired communication methods such as Ethernet, xDSL (ADSL or VDSL), Hybrid Fiber Coax (HFC), Fiber to The Curb (FTTC), Fiber to The Home (FTTH), and the like may be used in the communication network 40.

In the meantime, the communication network 40 is not limited to the communication method described above, and may include all types of communication methods widely known or to be developed in the future in addition to the above communication methods.

Figure 5:
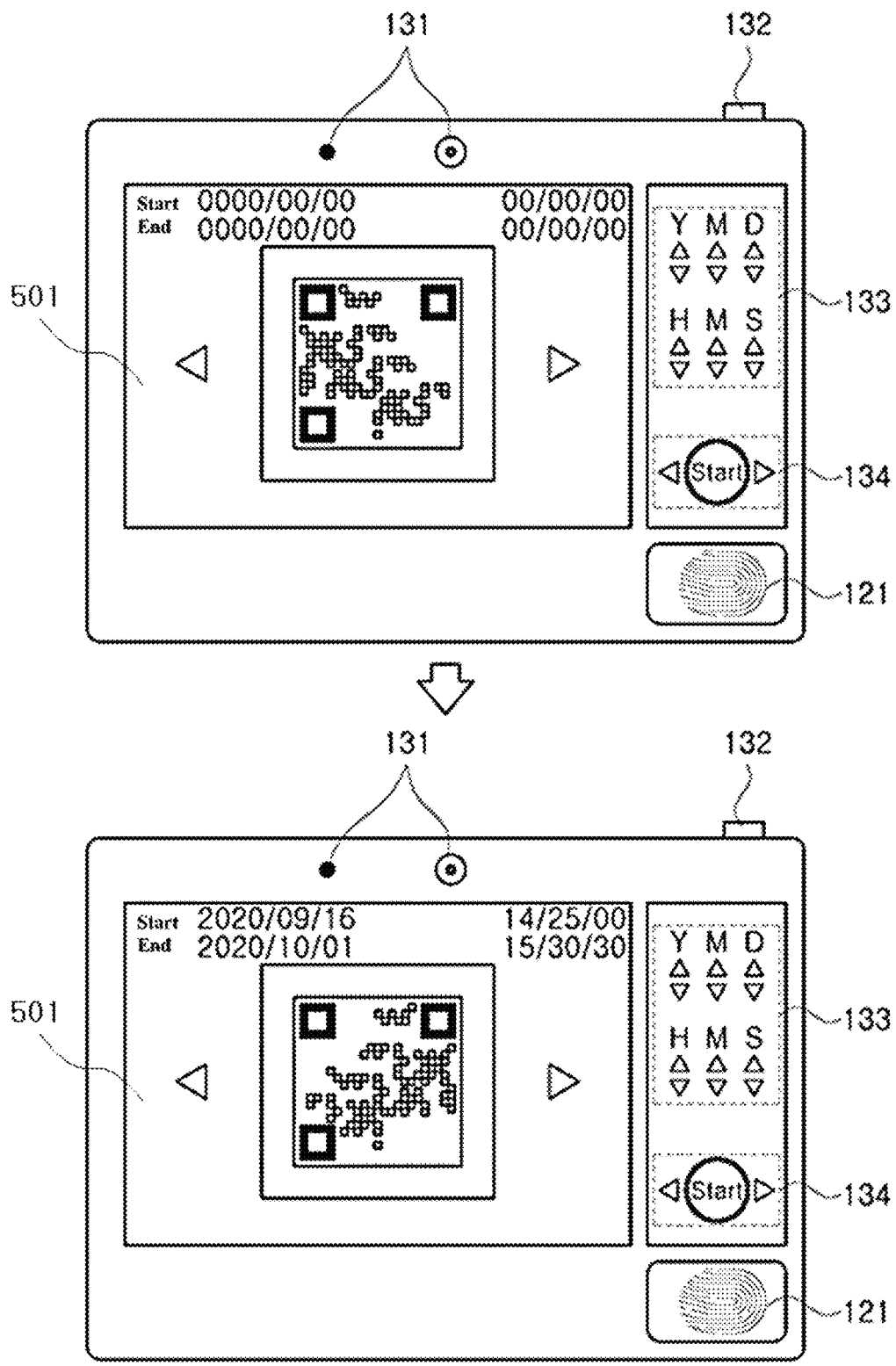
FIG. 5 is an exemplary diagram illustrating a QR code displayed on an apparatus depending on a user's time zone input, according to an embodiment of the inventive concept.

FIG. 5 is an exemplary diagram illustrating a QR code displayed on the apparatus 10 depending on a user's time zone input, according to an embodiment of the inventive concept.

The apparatus 10 may include the first input unit 130 including the start or screen on/off button 132, a time setting button 133, and an adjustment button 134 for displaying a QR code. The first control unit 160 of the apparatus 10 may set a specific time zone depending on an input of the time setting button 133 as a second button input of the input unit 130, may search for at least one QR code, which is generated during the set specific time zone, among QR codes, and may display the at least one QR code on a screen 501. Alternatively, the first control unit 160 of the apparatus 10 may set a specific time zone depending on an input of the time setting button 133 as a second button input of the input unit 130, may generate at least one QR code, and may display the at least one QR code on the screen 501 based on the status information corresponding to the set specific time zone.

In the apparatus 10 shown on the upper side of FIG. 5, when a user enters a 'start' button of the adjustment button 134, the first control unit 160 of the apparatus 10 may display the QR code at a first point in time when the user enters the 'start' button of the adjustment button 134 on the screen 501 of the first display unit 140.

Moreover, referring to FIG. 5, the adjustment button 134 may include right and left arrow buttons, which are positioned on both sides of the 'start' button. When the user enters the left arrow button of the adjustment button 134, the first control unit 160 of the apparatus 10 may display a QR code before a reference point on the screen 501 of the first display unit 140. Alternatively, when the user enters the right arrow button of the adjustment button 134, the first control unit 160 of the apparatus 10 may display a QR code after the reference point on the screen 501 of the first display unit 140. Here, the reference time may be a time set by the user through the time setting button 133 or a current time.

In the apparatus 10 shown on the bottom side of FIG. 5, when the user enters the start time for identifying the status information as "14:25:00 on Sep. 16, 2020" through the time setting button 133 and enters the end time as "15:30:30 on Oct. 1, 2020" through the time setting button 133, the first control unit 160 of the apparatus 10 may display at least one QR code for status information between the start time and the end time on the screen 501 of the first display unit 140.

Besides, in the apparatus 10 shown on the bottom side of FIG. 5, when the user enters a 'start' button again at a second point in time when a specific amount of time has elapsed from the first point in time when the user enters the 'start' button of the adjustment button 133, the first control unit 160 of the apparatus 10 may generate and display a QR code at the second point in time, which is different from a QR code at the first point in time, on the screen 501 of the first display unit 140 in real time.

Figure 6:
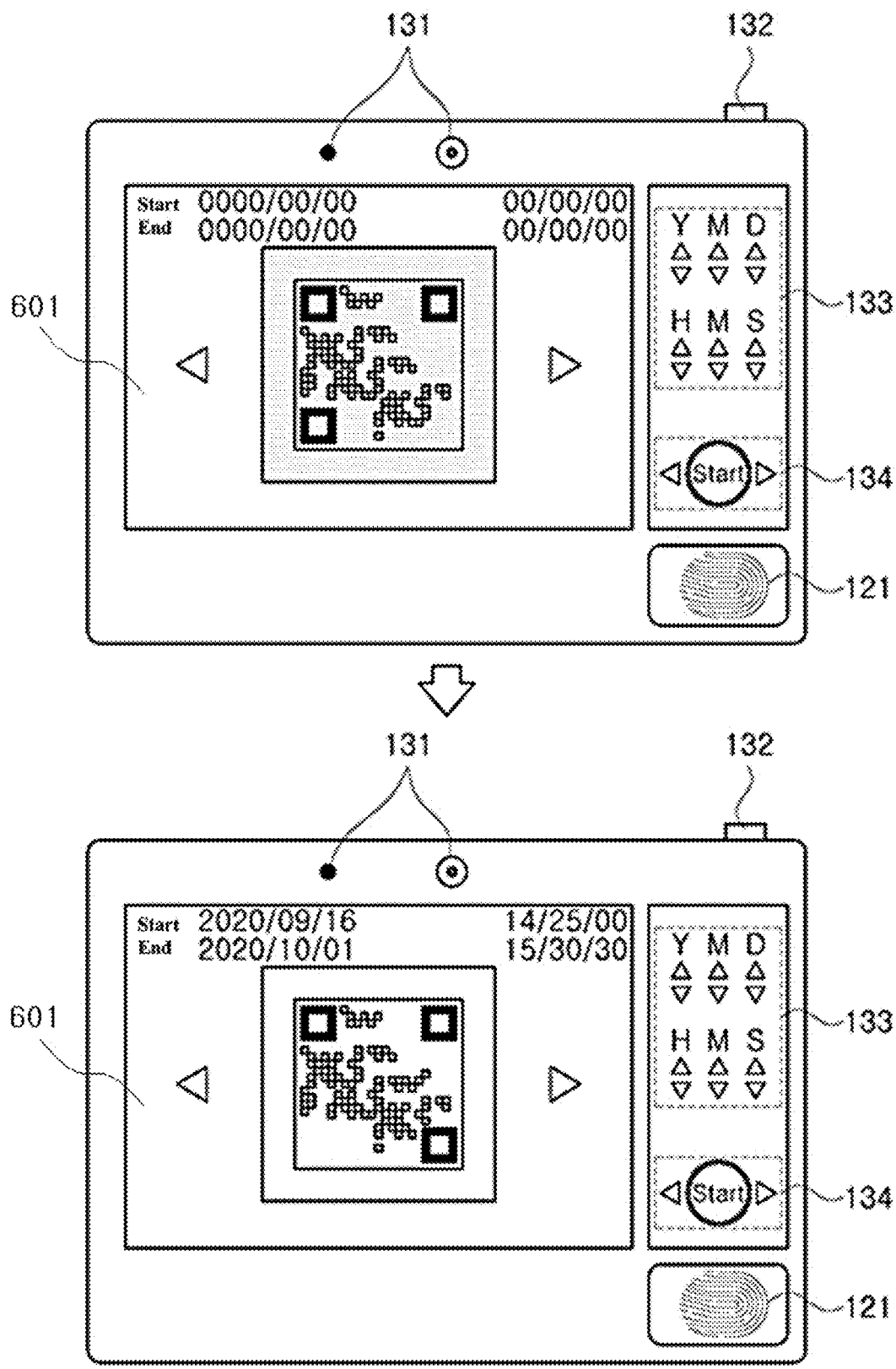
FIG. 6 is an exemplary diagram illustrating a change in brightness of a screen and a change in magnification of a QR code when the QR code is displayed on an apparatus, according to an embodiment of the inventive concept.

FIG. 6 is an exemplary diagram illustrating a change in brightness of a screen and a change in magnification of a QR code when the QR code is displayed on the apparatus 10, according to an embodiment of the inventive concept.

Whenever a QR code is displayed on a screen 601, the first control unit 160 of the apparatus 10 may control a screen brightness of the first display unit 140 so as to be increased to a predetermined brightness or more.

Whenever the QR code is displayed on the screen 601, the first control unit 160 of the apparatus 10 may control the logistics vehicle 2 by transmitting a signal for instructing an interior light to be turned on through the first communication unit 110 such that an interior light in the logistics vehicle 2 is automatically turned on. Here, the first control unit 160 may further detect the degree of proximity of the external terminal 20 that recognizes the QR code through a proximity sensor of the sensor unit 120 and then may change the magnification of the QR code depending on the degree of proximity between the external terminal 20 and the first display unit 140, which is sensed through the sensor unit 120.

Figure 7:
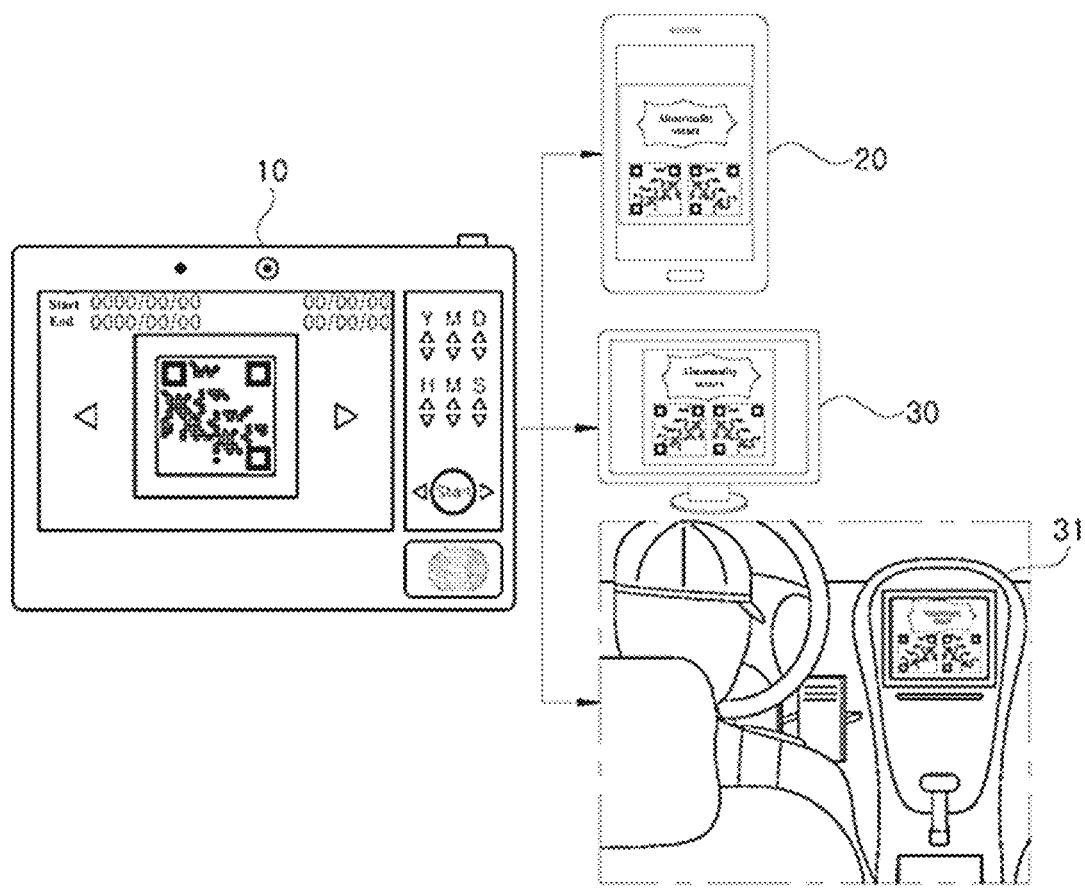
FIG. 7 is an exemplary diagram for describing driving of an apparatus for providing a notification that an abnormality in status information occurs, when the abnormality occurs, according to an embodiment of the inventive concept.

FIG. 7 is an exemplary diagram for describing driving of the apparatus 10 for providing a notification that an abnormality in status information occurs, when the abnormality occurs, according to an embodiment of the inventive concept.

Referring to FIG. 7, when it is detected that an abnormality in a logistics has occurred, based on status information generated periodically, the first control unit 160 of the apparatus 10 transmits information for notifying the external terminal 20 or the external device 30 that an abnormality in the logistics occurs, or may transmit the information so as to be displayed on a screen of an audio-video-navigation (AVN) 31 of the logistics vehicle 2.

Until the state of the logistics is normal, the first control unit 160 of the apparatus 10 may periodically transmit the information to the external terminal 20 or the external device 30.

The first control unit 160 of the apparatus 10 may store a first QR code at a point in time when the abnormality in the logistics occurs, in the information indicating that the abnormality in the logistics occurs and may transmit the information to an external device, for example, the external terminal 20 or the external device 30. Here, the external terminal 20 may be a terminal used by a delivery driver who delivers the logistics by driving the logistics vehicle 2. The external device 30 may be a logistics central server, a server of a producer that transfers logistics, a server of a customer that receives the logistics, or the like.

The first control unit 160 of the apparatus 10 may store the first QR code at the point in time when the abnormality in the logistics occurs, in the information indicating that the abnormality in the logistics occurs and may transmit the information so as to be displayed on a screen of the AVN 31 of the logistics vehicle 2.

The first control unit 160 of the apparatus 10 may store the first QR code and location information at a point in time when the abnormality in the logistics occurs, in the information indicating that the abnormality in the logistics occurs and may transmit the information to the external device 30.

The first control unit 160 of the apparatus 10 may store the first QR code at the point in time when the abnormality in the logistics occurs, in the information indicating that the abnormality in the logistics occurs and may transmit the information to the external device 30 together with the QR code before the abnormality in the logistics occurs. Here, a manager using the external device 30 may clearly determine whether the abnormality in the logistics occurs, by comparing the first QR code at a point in time when the abnormality in the logistics occurs, and the second QR code before the abnormality in the logistics occurs, which are displayed on the external device 30.

Here, the first control unit 160 may generate a lookup table in which the location information is matched with the first QR code and the second QR code and may store the lookup table in the first memory 150. Afterward, the first control unit 160 may generate statistical information about a point at which the abnormality in a logistics occur most frequently and a fluctuation range of a sensing value for respective status information based on the first QR code and the second QR code for respective location information stored in the lookup table.

Furthermore, the first control unit 160 of the apparatus 10 may capture an image of the logistics in the logistics vehicle 2 at the time when the abnormality in the logistics occurs, through a black box (camera) in the logistics vehicle 2, may store the captured image in information indicating that the abnormality in the logistics occurs, and may transmit information to the external device 30.

Figure 8:
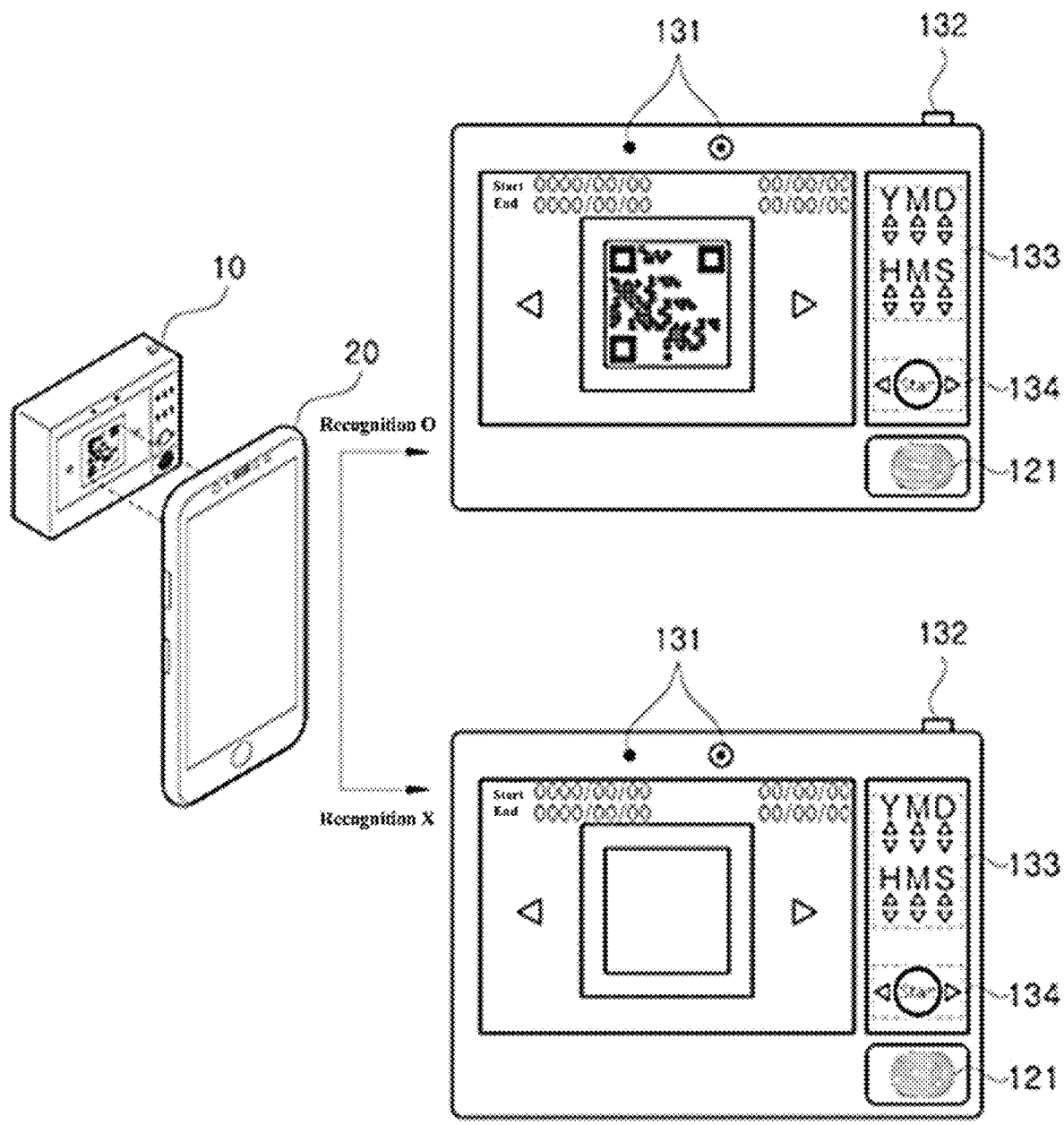
FIG. 8 is an exemplary diagram for describing driving of an apparatus when an external terminal attempts to recognize a QR code displayed on an apparatus, according to an embodiment of the inventive concept.

FIG. 8 is an exemplary diagram for describing driving of the apparatus 10 when the external terminal 20 attempts to recognize a QR code displayed on the apparatus 10, according to an embodiment of the inventive concept.

Referring to FIG. 8, when the external terminal 20 attempts to recognize a QR code displayed on a screen of the apparatus 10, the first control unit 160 of the apparatus 10 may perform an authentication process on the external terminal 20. Here, in recognition for recognition attempts, the access of the external terminal 20 may be recognized through a proximity sensor of the sensor unit 120; the access of the external terminal 20 may be recognized through the first camera 131 included in the sensor unit 120; and, the access of the external terminal 20 may be recognized through an ultrasonic sensor or infrared sensor of the sensor unit 120.

The first control unit 160 of the apparatus 10 may recognize a fingerprint of a user of the external terminal 20 through the finger scan sensor 121 of the sensor unit 120 and then may perform an authentication process on the external terminal 20 based on the recognized information. Alternatively, the first control unit 160 of the apparatus 10 may recognize the iris of the user of the external terminal 20 through a camera that recognizes the iris among the first camera 131 of the first input unit 130 and then may perform an authentication process on the external terminal 20 based on the recognized information.

The first control unit 160 of the apparatus 10 may transmit a request signal of authentication information to the external terminal 20 through the first communication unit 110 and then may determine whether authentication is successful, based on the authentication information received from the external terminal 20.

When it is determined, based on the authentication is successful, that the external terminal 20 is authenticated, the first control unit 160 of the apparatus 10 may display the QR code or may transmit status information paged on the QR code to the external terminal 20.

When it is determined, based on whether the authentication is successful, that the external terminal 20 is not authenticated, the first control unit 160 of the apparatus 10 may generate a re-authentication request signal of the authentication information and may transmit the re-authentication request signal to the external terminal 20.

When the authentication fails, the first control unit 160 of the apparatus 10 may transmit the re-authentication request signal to the external terminal 20 by default. When the re-authentication fails the predetermined number of times or more, the first control unit 160 of the apparatus 10 may generate a dummy QR code indicating fake information and then may display the dummy QR code on the screen instead of the QR code. Alternatively, when the re-authentication fails the predetermined number of times or more, the first control unit 160 of the apparatus 10 displays another predetermined image (e.g., prohibit access) instead of the QR code, or may lock a screen after turning off the screen on which the QR code is displayed.

FIG. 9 is a flowchart illustrating a process of controlling smart logistics monitoring in the apparatus 10, according to an embodiment of the inventive concept.

The first control unit 160 of the apparatus 10 may obtain at least one of the temperature, acceleration, humidity, illuminance, inclination, impact, and location of the inside of a logistics vehicle, which are sensed through the sensor unit 120 (S901).

The first control unit 160 may generate pieces of status information of a logistics according to the sensed result of the sensor unit 120 at each predetermined period (S902).

The first control unit 160 may generate QR codes respectively indicating the pieces of status information (S903).

The first control unit 160 may display the QR codes on a screen of the apparatus 10 (S904).

For example, the first control unit 160 may display a QR code, which corresponds to a point in time when a first button is operated, from among the QR codes.

Here, each of the QR codes may be sequentially changed and displayed whenever the first button is operated.

As another example, the first control unit 160 may set a specific time zone depending on an input of a second button of the input unit 130, may search for at least one QR code, which is generated during the set specific time zone, from among the QR codes, and may display the at least one QR code on the screen.

When it is detected that an abnormality in the logistics occurs, based on status information generated at the predetermined period, the first control unit 160 may transmit information indicating that the abnormality in the logistics occurs, to the external device (S905).

Here, the first control unit 160 may transmit a QR code at a point in time when the abnormality in the logistics occurs, so as to be displayed on a screen of the AVN of the logistics vehicle.

When an external terminal attempts to recognize a QR code displayed on the screen, the first control unit 160 may perform an authentication process on the external terminal (S906).

Here, the first control unit 160 may transmit a request signal of authentication information to the external terminal through the first communication unit 110 and then may determine whether authentication is successful, based on the authentication information received from the external terminal.

When the authentication is successful, the first control unit 160 may display the QR code (S907).

In the meantime, the first control unit 160 may directly recognize the QR code including (or indicating) address information of a website through the second camera of the external terminal 20, not through an application. Accordingly, when the external terminal 20 recognizes the QR code through the second camera, the external terminal 20 may link to a specific website. In this case, the specific website may be a website (e.g., a homepage) that provides status information on a product. Besides, the address information may include a uniform resource locator (URL) of the website.

When the authentication fails, the first control unit 160 may interrupt displaying of the QR code or may display a dummy QR code indicating fake information (S908).

Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, a system may sense at least one of the temperature, acceleration, humidity, illuminance, inclination, impact, and location of the inside of a logistics vehicle that delivers logistics, and may provide status information in the logistics vehicle in a form of a QR code. In the case where a user has a terminal capable of recognizing the QR code and the corresponding app, when the system omits a cumbersome process and easily recognizes the QR code through the external terminal, the system may easily, accurately and conveniently identify a status inside the logistics vehicle and may take necessary actions.

Furthermore, according to an embodiment of the inventive concept, because a procedure of identifying a status in a logistics vehicle is simplified, an integrated monitoring service is possible, thereby increasing efficiency. In addition, it is possible to minimize the issuance of many paper certificates, such as certificate documents and inspection papers, which need to be submitted at each time in a conventional distribution process.

Moreover, according to an embodiment of the inventive concept, it is possible to reduce a risk of being hacked and to prevent manipulation of logistics status, by generating a QR code at each time at which a user requests the QR code or at each period designated by a user when the QR code is created and providing the QR code to the user. Accordingly, reliability of data may be increased.

Besides, according to an embodiment of the inventive concept, the user may set a period of the QR code to the desired period so as to recognize the period of the QR code.

Accordingly, it is possible to obtain status information having a period during which a distribution worker or seller wants to identify a product.

Also, according to an embodiment of the inventive concept, when a logistics vehicle is scrapped or re-purposed, it is possible to reduce the waste of an apparatus by configuring the apparatus so as to be recyclable. Accordingly, cost may be reduced.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An apparatus for outputting a continuously changed QR code by reflecting a monitored logistics status, the apparatus comprising:
   a display unit;
   a memory;
   a sensor unit configured to sense at least one status information of a temperature, acceleration, humidity, illuminance, inclination, impact, and location of an inside of area where goods are loaded; and
   a control unit configured to:
   generate a respective QR code comprising status information of a logistics according to a sensed result and an Internet address at a predetermined period; and
   display the respective QR code on a screen of the display unit,
   wherein storage capacity of one QR code is predetermined,
   wherein the respective QR code is continuously changed and generated until the number of units of the status information that can be stored in one QR code is accumulatively filled,
   wherein the respective QR code is converted and displayed on the screen depending on an order in which the respective QR code is generated, and
   wherein the respective QR code is changed according to a state of the logistics that is changed within a corresponding period.

2. The apparatus of claim 1, further comprising:
   an input unit receiving information from a user, and
   wherein the control unit is further configured to display a QR code, which corresponds to a point in time when the input unit is operated, from among the respective QR code on the screen.

3. The apparatus of claim 2, wherein the respective QR code is sequentially changed and displayed whenever the input unit is operated.

4. The apparatus of claim 1, further comprising:
   a communication unit configured to communicate with an external terminal, and
   wherein, when it is detected that an abnormality in the logistics occurs, based on the respective status information generated at the predetermined period, the control unit is further configured to transmit information for indicating that the abnormality in the logistics has occurred, to the external terminal.

5. The apparatus of claim 4, wherein the control unit transmits a QR code at a point in time when the abnormality of the logistics occurs, so as to be displayed on an audio-video-navigation (AVN) screen of a logistics vehicle.

6. The apparatus of claim 1, further comprising:
a communication unit configured to communicate with an external terminal; and
wherein the control unit is further configured to transmit the status information to the external terminal via the communication unit.

7. The apparatus of claim 6, wherein the control unit transmits the status information to the external terminal when an authentication performed based on authentication information received from the external terminal is successful.

8. An apparatus for outputting a continuously changed QR code by reflecting a monitored logistics status, the apparatus comprising:
a display unit;
a memory;
a sensor unit configured to sense at least one status information of a temperature, acceleration, humidity, illuminance, inclination, impact, and location of an inside of area where goods are loaded;
a control unit configured to:
generate respective status information of a logistics according to a sensed result at a predetermined period;
generate a respective QR code indicating the respective status information; and
display the respective QR code on a screen of the display unit,
wherein the respective QR code is converted and displayed on the screen depending on an order in which the respective QR code is generated; and
an input unit configured to receive information from a user,
wherein the control unit is further configured to:
set a specific time zone depending on an input of the input unit;
search for at least one QR code, which is generated during the set specific time zone, from among the respective QR code; and
display the at least one QR code on the screen.

9. A control method of an apparatus for outputting a continuously changed QR code by reflecting a monitored logistics status, the method comprising:
sensing at least one status information of a temperature, acceleration, humidity, illuminance, inclination, impact, and location of an inside of area where goods are loaded through a sensor unit of the apparatus;
generating a respective QR code comprising status information of a logistics according to a sensed result and an Internet address at a predetermined period; and
displaying the respective QR code on a screen of the apparatus,
wherein storage capacity of one QR code is predetermined,
wherein the respective QR code is continuously changed and generated until the number of units of the status information that can be stored in one QR code is accumulatively filled,
wherein the respective QR code is converted and displayed on the screen depending on an order in which the respective QR code is generated, and
wherein the respective QR code is changed according to a state of the logistics that is changed within a corresponding period.

10. The method of claim 9, wherein the displaying includes:
displaying a QR code, which corresponds to a point in time when an input unit of the apparatus is operated, from among the respective QR code on the screen.

11. The method of claim 10, wherein the respective QR code is sequentially changed and displayed whenever the input unit is operated.

12. The method of claim 9,
wherein the displaying includes:
setting a specific time zone depending on an input of an input unit of the apparatus;
searching for at least one QR code, which is generated during the set specific time zone, from among the respective QR code; and
displaying the at least one QR code on the screen.

13. The method of claim 9, further comprising:
when it is detected that an abnormality in the logistics occurs, based on the respective status information generated at the predetermined period, transmitting information for indicating that the abnormality in the logistics occurs, to an external terminal via a communication unit of the apparatus.

14. The method of claim 9, further comprising:
transmitting the status information to an external terminal via a communication unit of the apparatus when an authentication performed based on authentication information received from the external terminal is successful.

* * * * *